United States Patent

[11] 3,547,408

| [72] | Inventor | George R. Klingenberg |
| | | 615 S. Wright Ave., Tacoma, Wash. 98408 |
| [21] | Appl. No. | 723,143 |
| [22] | Filed | Apr. 22, 1968 |
| [45] | Patented | Dec. 15, 1970 |

[54] SPRAYING METHODS AND APPARATUS FOR SPRAYING GLUE, PLASTICS, AND OTHER JOINING AGENTS AND COATINGS WITH AIR UNDER PRESSURE
3 Claims, 8 Drawing Figs.

| [52] | U.S. Cl. | 259/4, 239/8 |
| [51] | Int. Cl. | B01f 15/00 |
| [50] | Field of Search | 259/4, 7, 8, 5, 6, 9, 18; 239/8 |

[56] References Cited
UNITED STATES PATENTS

| 2,894,732 | 7/1959 | Taber | 259/4 |
| 3,067,987 | 12/1962 | Ballou | 259/7 |
| 3,156,535 | 11/1964 | Humphreys | 259/8X |

*Primary Examiner*—Robert W. Jenkins
*Attorney*—Roy E. Mattern, Jr.

ABSTRACT: For spraying glue, plastics and other joining agents and liquids with air under pressure regarding the manufacture of products and also for spraying in conjunction with animal feeds such as spraying molasses on meals and grains, and also for spraying fertilizers, solvents, etc. these spraying methods and apparatus all utilize a spraying device comprising a housing or body which has: a mixing chamber; a differential pressure chamber divided by a diaphragm which moves at its midsection to move a valve member which controls flow of glues, plastics, etc. through an orifice in the housing located at the mixing chamber; passageways for air and for glues, plastics or other joining agents and liquids to be mixed with air leading to a leaving from the mixing and differential chambers; fittings to join passageways of the housing to a pressurized air supply, a pressurized glue, plastic, etc. supply, and a controlled-spray nozzle in communication with the mixing chamber, and, as necessary, connectors for supporting structures, handles, etc. and also fluid flow regulators.

INVENTOR.
GEORGE R. KLINGENBERG
BY
Roy Mattern Jr.
ATTORNEY

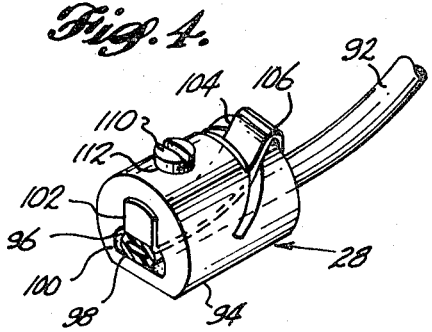
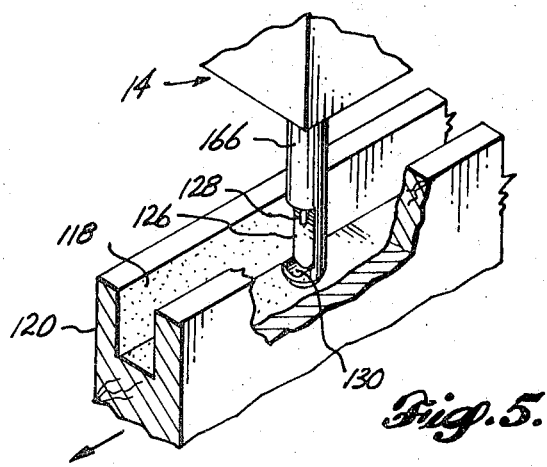
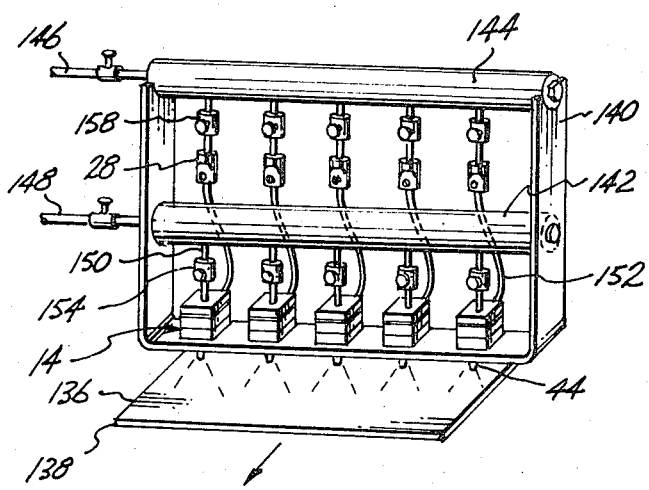
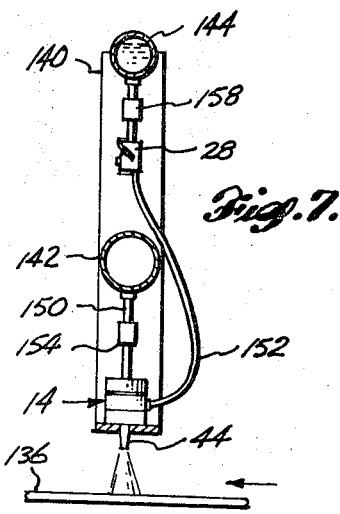
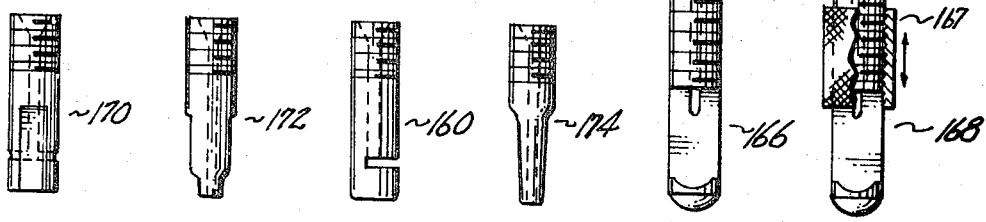

3,547,408

1

SPRAYING METHODS AND APPARATUS FOR SPRAYING GLUE, PLASTICS, AND OTHER JOINING AGENTS AND COATINGS WITH AIR UNDER PRESSURE

BACKGROUND OF THE INVENTION

There remains a need for spraying apparatus and methods which lend themselves to fast production and/or fast utilization methods. U.S. Pat. No. 3,341,124 issued to Mr. Derek Barnes of Canada discusses the need and fulfills some of the overall aspects. There still remains a need for lower cost apparatus which is ready to go at anytime during a shift working period and also during a reasonable sequence of shift periods inclusive of over week end shut downs.

This invention provides spraying apparatus and methods which give this "always ready to go performance." If improper mixes ever do occur, long shut downs occur, or air pressures fail preventing the convenient cleaning air under pressure action, the apparatus of this invention is quickly and conveniently disassembled, cleaned and reassembled for continued use.

SUMMARY OF INVENTION

This invention provides apparatus and methods to spray glue, plastics and other joining agents and liquids with air under pressure upon demand, for manufacturing products, preparing feed cleaning with solvents, fertilizing, etc., inclusive of idle times, without normally requiring a stop to disassemble the mixing and spraying housing and nozzles to clean out passageways. All apparatus and methods involve the inner operations of a housing assembly which has the following:

A mixing chamber for intermixing compressed air and a material such as glue, for example, prior to its discharge through a nozzle connected to the housing;

Another overall chamber divided into two smaller chambers by a flexible diaphragm, with one smaller chamber receiving air from a pressurized air source and delivering it to a passageway leading to the mixing chamber, with the other smaller chamber receiving materials such as glue from a pressurized glue source and delivering it to a passageway leading to the mixing chamber; and A spring return bias valve positioned in the glue passageway leading to the mixing chamber and connected to the flexible diaphragm so that movement of the flexible diaphragm upon the air pressure exceeding the glue pressure will open this glue valve against the force of its spring and thereby glue under its pressure will enter the mixing chamber and be mixed with air under pressure which is being discharged from the smaller chamber of air into the chamber to be interdispersed with glue, for example, and then sprayed through a selected nozzle on to a workpiece.

DRAWINGS

A preferred embodiment of the principal component of apparatus of this invention, various nozzled and representative interconnections of apparatus are illustrated in the drawings wherein:

FIG. 4 is an enlarged perspective view, with portions shown in dotted lines to illustrate the flow control unit used in the line which conveys glue, for example, to the principal component as indicated in FIG. 1;

FIG. 5 is a perspective view of a nozzle removably secured to the principal component to direct glue, for example, into the groove of a construction member to be secured to another member joined together in a glued tongue and groove connection;

2

FIG. 6 is a partial perspective view indicating how several of the principal components are arranged and mounted to spray glues, liquids, etc. on panel members moving relative to them;

FIG. 7 is an enlarged partial sectional view of one principal component, as arranged in FIG. 6, to show its mounting and location in conjunction with an associated flow control and shut off valves and sources of glue, liquids, etc. and air; and FIG. 8 is a collective view of a selected number of nozzles indicating their construction to obtain specific patterns of discharge of fluid/air mixtures.

EMBODIMENTS

General Arrangements

Figure 1:
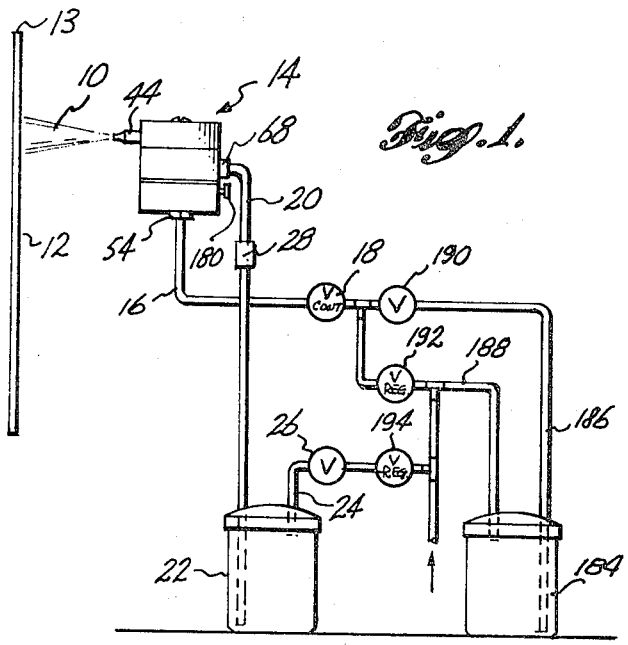
FIG. 1 is a side view of an assembly of apparatus spraying a work piece, inclusive of cleaning apparatus used before extended holidays, etc.

The basic arrangement of apparatus and its method of operation is shown in FIG. 1. The principal component 14 shown therein is illustrated specifically in FIGS. 2 and 3. FIGS. 4, 5 and 8 show additional apparatus. FIGS. 5, 6 and 7, like FIG. 1, indicate the arrangement of components and methods of operation which increase both the efficiency and effectiveness of the spraying of fluid/air mixtures.

In the basic arrangement of FIG. 1, a fluid/air mixture 10 is illustrated as being sprayed onto surface 12 of panel 13. The principal component 14 hereinafter referred to as spraying device 14 is connected, via conduit 16 and a manually operated valve 18, to a pressurized gas supply which is not shown. The supply hereinafter will be referred to as being a pressurized air supply or air supply. The spraying device 14 is also connected, via conduit 20, to a container 22 which will hold, under pressure, a glue, paint, plastic coating, etc. Hereinafter, glue will be referred to as the substance held in container 22 until discharged through spraying device 14 as it is mixed with compressed air.

Pressure is maintained in container 22, by using a gas under pressure, such as air under pressure, from the pressurized gas supply which is not shown. This gas will be directed to container 22 through conduit 24 and shut off valve 26.

To provide for a better control of the glue flowing from container 22 to spraying device 14, over an and above the regulation of air valve 26, a glue flow control valve 28 is installed in conduit 20 to regulate the flow. This valve 28 is shown, as enlarged, in FIG. 4. Other installation places of glue control valve 28 are illustrated in FIGS. 6 and 7 where higher production methods are shown, for example, wherein panels are moved in relation to a group of spraying devices 14. Other apparatus shown in this FIG. 1, is described subsequently in regard to cleaning and/or flushing of apparatus.

Principal Component-Spraying Device

Figure 2:
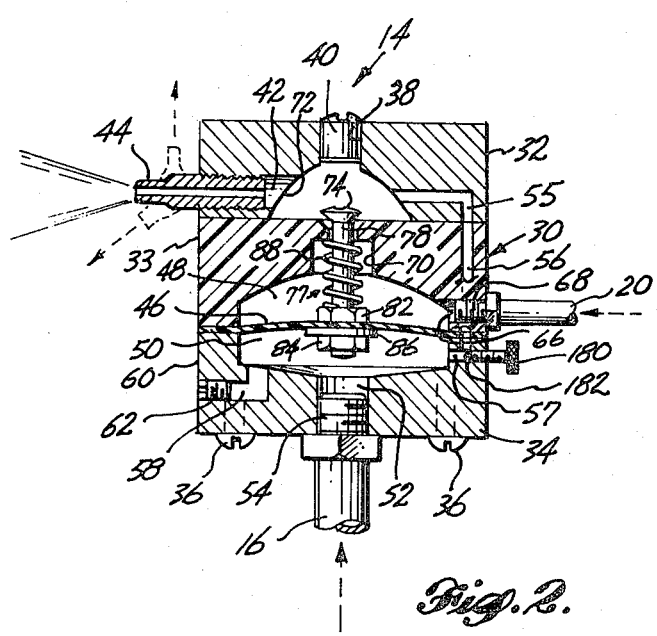
FIG. 2 is a sectional side view of the principal component wherein mixing occurs and flow of glue, for example, is started and stopped.
Figure 3:
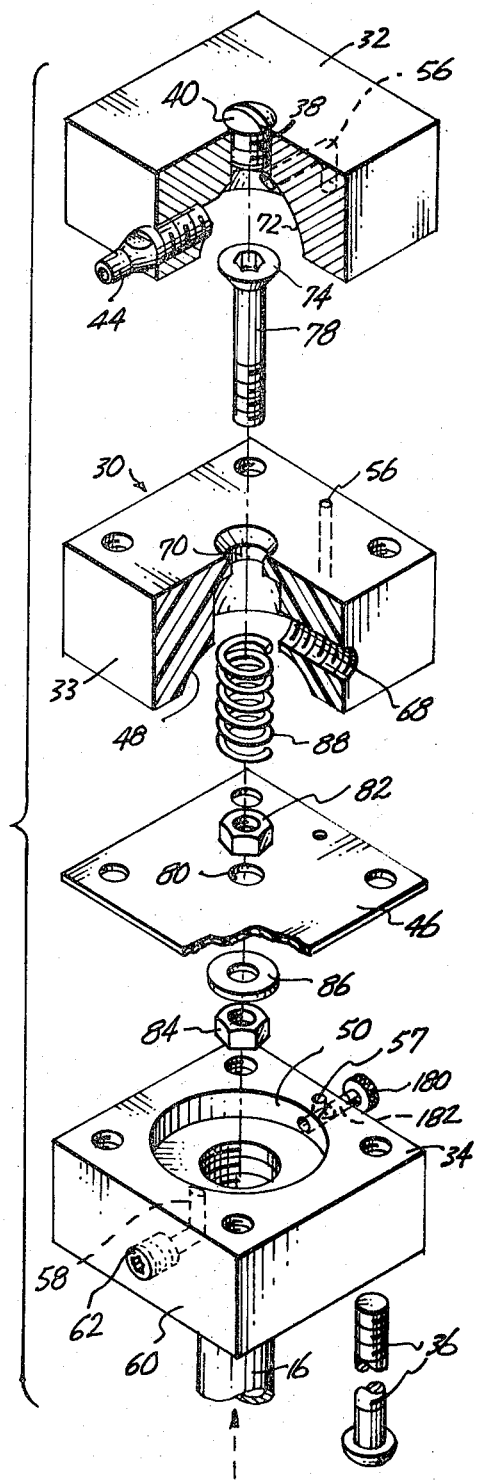
FIG. 3 is an exploded perspective view of the principal component illustrated in FIG. 2.

Shown in cross section in FIG. 2 and in an exploded view in FIG. 3 is the principal component 14 of this spraying apparatus which is used in practicing the methods as they are described herein. This component in this description is referred to as the spraying device 14 although other attachments and equipment are needed to effectively spray the fluid/air mixtures.

As shown in FIGS. 2 and 3, this spray device 14 comprises a housing or body 30 which, both for utilization of different materials and convenience of lower cost production, assembly and overhaul is composed of top 32 and center 33 and bottom 34 portions inclusive of a diaphragm portion 46. Four screws 36 preferably made of stainless steel, passing through aligned holes in the corners of bottom 34, diaphragm 46, and center 33 portions enter similarly aligned threaded holes in top portion 32 to hold all these portions together in establishing the overall housing or body structure 30.

The top portion 32 has the fluids or glue air mixing chamber 38. Passageways 42 and 43 serve, alternatively and optionally, as discharge paths for the mixture. As shown in FIGS. 2 and 3 passageway 42 terminates in top portion 32 where a selected "straight away" nozzle 44 is threaded in place and passageway 43 is blocked by screw 40 which serves as a plug. Compressed air enters mixing chamber 38 through passageway 55 which extends from center portion 33. Glue enters mixing chamber 38 through its bottom opening 72, and as subsequently described a valve assembly 77 in center portion 33 determines whether or not glue will be so entering mixing chamber 38. Preferably top portion 32 is made from aluminum and/or an alloy thereof which is chrome plated. It may also be made from a teflon or teflonlike substance.

The center portion 33 there is a continuation 56 of a passageway for air going to passageway 55 in upper portion 32. Also in center portion 33, directly below bottom opening 72 in upper portion 32, a vertical passageway 70 for glue commences at its top in a countersunk bearing surface 73 and terminates below at top surface 47 of a glue chamber 48. This chamber 48 is essentially by center portion 33, as shown in both FIGS. 2 and 3 and the remaining boundary of glue chamber 48 is variably determined by unrestrained diaphragm material 45 of diaphragm portion 46. A horizontal passageway 66 directs glue under pressure to chamber 48 from fitting 68 which is in turn connected to glue supply conduit 20.

Secured to the center of diaphragm portion 46 by a combination of nuts 82, 84 and a washer 86, is a vertical stem 78 which passes up through the center of passageway 70 leaving clearance for glue to flow and also for installation of a surrounding compression coil spring 88. This vertical stem 78 terminates in a valve head 74, which under this spring force, seats on the countersunk bearing surface or valve seat 73 until the spring force is counteracted. The parts such as nuts, washers, stem, spring and valve head are preferably made of stainless steel. Also this center section is preferably made from a material known as Teflon or Teflonlike material which is resistant to acids and to low temperature heat.

Such counteraction causing separation of valve head 74 from valve seat 73 allowing glue to pass into mixing chamber 38 involves upper movement of diaphragm material 45. When such movement will occur is best understood by first noting the construction of lower portion 34 of housing or body 30. Lower portion 34 commences with air chamber 50 almost completely defined by its own material which is aluminum and/or an alloy thereof which has been chrome plated, and finally defined, upon assembly, by diaphragm portion 46.

Air coming from a pressurized supply, not shown, through conduit 16, fitting 54, continues on to air chamber 50 through passageway 52 of lower portion 34. During spraying, air leaves air chamber 50 through passageway 57 which is aligned with passageways 56, 55, all leading to mixing chamber 38. Screw plug 62 and passageway 58 serve as air and/or solvent entry and discharge means for cleaning and venting at selected times.

Although in most instances, this principal component 14 will be used as a sprayer utilizing compressed air in the spray that is ejected, where there is an occasional demand for laying a solid bead, quick movements of closing needle valve 180 will be undertaken to block passageway 182. For this purpose, as shown in FIGS. 2 and 3, the needle valve 180 is preferably installed in a bypass passageway 182, which extends from air passageway 57 out through lower portion 34. When only a heavy bead of glue, for example, is to be discharged from nozzle 44, without the mixing of air, air under pressure is then only used to move diaphragm 46. Needle valve 180 is adjusted to block flow of compressed air through passageway 57 and consequently no compressed air is able to reach passageway 56 and mixing chamber 38.

DIFFERENTIAL PRESSURES CONTROLLING

DIAPHRAGM AND i.e. GLUE VALVE OPENING

As shown in FIG. 2, diaphragm portion 46 of housing or body 30, has its unrestricted material 45 serving as a flexible diaphragm which is shown moved upwardly. Such movements causes lifting of valve head 74 off of valve seat 73 allowing glue to pass into mixing chamber 38. This flexure of diaphragm material 45, which is preferably made of material known as Teflon or Teflonlike material which is resistant to acids and to low temperature heat, occurs when air pressures exceed glue pressures. During the preferred operations, air pressures are approximating 40 p.s.i. and glue pressures are approximating 20 p.s.i., when glues are not thick. If glues are thick then air pressures are increased, for example, to 90 p.s.i. with an accompanying increase in glue pressures, for example, to 45 p.s.i. The resulting differential pressure overcomes the compression or return force of coil spring 88 and valve stem 78 rises because of its securement to the uplifting diaphragm material 45. Conversely when the air pressure drops below a certain level, generally equal to or less than the glue pressure, diaphragm material 45 returns to its singular reference plane reseating valve head 74 on valve seat 73 and stopping the flow of glue. Spring 88 hastens the diaphragm return supplementing the differential pressure return force and continuing to keep the valve assembly 79 closed in the absence of sufficient air and/or glue pressures.

REGULATION OF GLUE, PAINT, PLASTIC, ETC. FLOW

The operation of valves and regulation of pressures will always serve to control the quantity of glue, etc. available to flow into the mixing chamber 38. However, more selective flow adjustments are made by adjustment to the flow regulator 28 illustrated in FIG. 4. The glue is carried through this flow regulator 28 to a tube 92 made of plastic. The tube 92 slidably fits into and through the receiver 94 guided in a partially rounded 96 and partially flattened 98 opening 100. The opening 100 is large enough to also accommodate a strip of flexible metal 102 such as stainless steel. It is arranged to be first parallel to tube 92, then to be biased 104 to the exterior of receiver 94 and then to be bent 106 over an edge of receiver 94.

A set screw 110 is moved inwardly and outwardly with respect to a threaded hole 112 which is in receiver 94 and located in conjunction with opening 100. Set screw 110 is then positioned to be turned down against flexible metal 102 which in turn distributes this deforming compressive loading along a portion of tube 92 restricting the flow of glue through it. Conversely, as set screw 110 is moved outwardly tube 92 tends to return to its cross-sectional configuration which is less restrictive of the glue flowing on into mixing chamber 38.

Nozzle Design for Effective Spray Pattern

This flow regulator 28 is extremely useful in conjunction with various nozzles. In FIG. 5, a nozzle 116 is shown depending from section 32 as this principal component 14 is moved to place nozzle 116 into the groove 118 of board 120 which is moved relative thereto to spray the interior of groove 118 with glue for example, preparatory to joining board 120 to another, not shown, having a tongue.

Nozzle 116 has a guiding foot 124 at its bottom, a vertical cut back 126 to receive glue ejected downwardly from its opening 128, as illustrated in FIG. 5, and diffused as the glue in this first "spraying release" is deflected by striking the bottom 130 of cutback 126. The nozzle 116 is sized to pass in and along groove 118 to completely coat its bottom and sides. Such full but not overflowing nor over spraying is assured not only by the nozzle shape but also by the adjustment of flow regulator 28.

Multiple Nozzles Used Simultaneously in Production Lines

The versatility of this fluid/air spraying apparatus indicated by the nozzle 116 tailored to groove 118, is further broadened in noting how principal component 14 is mounted with other spray glue or another coating on a surface 136 of a panel 138 or other structural member moving relative to the group of spraying devices 14, as shown in FIG. 6. Several of these components 14 are mounted on a U-shaped frame 140 which also supports a glue manifold 142 and an air manifold 144, when gluing operations are underway. Each of these manifolds has an external fitting and valve assembly 146, 148 for respective connections to pressurized glue and air supplies, not shown.

Each spraying device 14, has a conduit 150 directing glue to it from glue manifold 142 and a conduit 152 directing air to it from air manifold 144. Connected in each air conduit 152 is a shut off air valve 154. Also connected in each glue conduit 150 are both a shut off valve 158 and a flow regulating valve 28. The latter are shown in greater detail in FIG. 7 in conjunction with a nozzle 160 which has a transverse slot diffuser 162 below opening 164 to disperse glue for effective coverage of a panel surface 136 when used with others as illustrated in FIG. 6.

Effective Interim Shut Down Cleaning and/or

Flushing Procedures-Weekends, Holidays

Whenever momentary or short shutdowns of glue spraying are to occur, reduction of air pressure with an operating valve 18, or the like, is undertaken. To eliminate any dripping, a means not shown, such as providing a bleed off, is utilized to quickly reduce any air pressure left in any length of line between such valve 18 and spraying device 14. This may be accomplished by having an open small port in this local of such air flow beyond the valve 18.

There will be times when production is to stopped, such as over weekends and holidays. If a heavy glue is being sprayed as a mixture and it possibly has shown a tendency to harden during an extended shutdown, or if any glue or other liquid is to be replaced by a different glue or liquid, then in either case, cleaning or flushing operations are undertaken by utilizing other apparatus illustrated in FIG. 1. At such a time, air shutoff valve 26 and air regulator valve 194 are shutoff and for a short time, thereafter, air pressure in line 16 continues to flush out the remaining glue in principal component 14 and nozzle 44 and also to drive glue back into tank 22. After this short run of air only, everything is temporarily shut down, by closing off main supply of compressed air, not shown.

Then, when a flushing by water or a solvent is desired; control valve 28 is closed or line 20 is removed from glue tank 22; valve 190 is opened in line 186 provided to conduct water and/or solvent from tank 184; valve 192 is closed; valve 194 remains closed; and then the supply of compressed air, not shown, is again turned on. By this setting of valves, air pressure forces water and/or solvent from tank 184 throughout lines 186 and 16, into principal component 14, out spray nozzle 44 and back into line 20 to valve 28, or if it is opened, throughout line 20 if it has been removed from glue tank 22. In this way or by using similar procedures, thorough cleaning is conveniently accomplished whenever and however apparatus of the invention is utilized such as in installations shown in FIGS. 1 and 6.

Effective Spray Area Controls

The effectiveness in controlling sprays was indicated in discussing flow regulator 28 and groove nozzle 166. Further effectiveness is indicated in FIGS. 6, 7 and 8. In FIG. 6 any one or more spraying units 14 may be transversely adjusted and/or shut off. In addition it may be equipped with a nozzle like the nozzle 160 of FIG. 7, also shown in FIG. 8, if it is located inwardly of the edges of panel 138. If, however, the spraying unit 14 is located nearer a panel edge or over it a side-projecting nozzle like 170 shown in FIG. 8 is installed. Or a bank of pointed nozzles 174 may be used where direct spraying rather than diffused or partially diffused spraying is thought to be more desirable to comply with product specifications and/or the flow characteristics of the resulting fluid/air spray. Again in reference to FIG. 5, variations in groove depths are compensated by selective placements of a threaded collar 167 on nozzle 168 used in place of nozzle 166.

CONCLUSION

The apparatus of this invention enables many manufacturers of many products that require spraying of liquids, as the products are being made, to completely and conveniently control such sprayed liquids before spraying and as they are sprayed at very substantially overall cost savings.

I claim:

1. Apparatus for spraying glue, plastics, molasses, fertilizers and other viscous liquids, comprising:
   a. a compressed fluid supply means such as a compressed air means;
   b. a container of a viscous liquid such as glue;
   c. a mixing device of multiple passageways to receive viscous liquid and direct it into a fluid stream flowing from the compressed fluid means; and
   d. a regulating valve means in the mixing device in a viscous liquid passageway to stop such flow when the compressed fluid means is reduced in pressure, the regulating valve means having a coiled spring to keep it shut, a valve stem secured to a diaphragm that in turn is secured in the mixing device for confrontation on respective sides by viscous liquid and compressed fluid and therefore the diaphragm is movable to open the valve means upon overcoming the coiled spring force when the pressure of the compressed fluid sufficiently exceeds the pressure of the viscous liquid.

2. Apparatus for spraying glue, plastics, molasses, fertilizers and other viscous liquids, comprising:
   a. a compressed fluid supply means such as a compressed air means;
   b. a container of a viscous liquid such as glue;
   c. a mixing device of multiple passageways to receive viscous liquid and direct it into a fluid stream flowing from the compressed fluid means;
   d. a flow-directing means to guide viscous liquid from its container to the mixing device; and
   e. a flow modification means secured to the flow-directing means to change the viscous flow rate having a hollow housing, a deformable tube changeable in cross section within its elastic limits positioned through the hollow housing to direct viscous liquid through it, and a deflectable means adjustable within the hollow housing to selectively deform the cross section of the tube within the hollow housing to modify the flow rate and quantity of viscous liquid.

3. Apparatus for spraying glue, plastics, molasses, fertilizers and other viscous liquids, comprising:
   a. a compressed fluid supply means such as a compressed air means;
   b. a container of a viscous liquid such as glue;
   c. a mixing device of multiple passageways to receive viscous liquid and direct it into a fluid stream flowing from the compressed fluid means;
   d. a bleed off means incorporated into the operation of the compressed fluid means to insure the compressed fluid means will promptly be reduced in pressure when the mixing is stopped; and
   e. a principal viscous liquid flow control valve incorporated into the operation of the mixing device having a self container spring biasing the valve into a closed position until it is opened by countering forces made effective by creating differential pressures across a diaphragm positioned by the mixing device to be confronted by both the viscous liquid on one side and the compressed fluid on the other side, whereupon the increase of such differential pressure caused by the relative increase in compressed fluid pressure over viscous liquid pressure becomes sufficiently great enough to overcome the spring force.